US009680758B2

(12) United States Patent
Stalley

(10) Patent No.: US 9,680,758 B2
(45) Date of Patent: Jun. 13, 2017

(54) APPARATUS AND METHOD TO INCREASE THROUGHPUT OF A TRANSMITTER

(71) Applicant: Intel Corporation, Santa Clara, CA (US)

(72) Inventor: Sean O. Stalley, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/843,883

(22) Filed: Sep. 2, 2015

(65) Prior Publication Data

US 2017/0063508 A1 Mar. 2, 2017

(51) Int. Cl.

| | |
|---|---|
| *H04L 12/801* | (2013.01) |
| *H04L 12/805* | (2013.01) |
| *H04L 12/841* | (2013.01) |
| *H04L 12/835* | (2013.01) |
| H04W 28/02 | (2009.01) |
| H04L 5/00 | (2006.01) |
| H04B 1/02 | (2006.01) |
| H04L 12/26 | (2006.01) |
| G06F 3/06 | (2006.01) |

(52) U.S. Cl.
CPC ............ *H04L 47/39* (2013.01); *H04L 47/10* (2013.01); *H04L 47/12* (2013.01); *H04L 47/28* (2013.01); *H04L 47/30* (2013.01); *H04L 47/365* (2013.01); *G06F 3/061* (2013.01); *G06F 3/0613* (2013.01); *G06F 3/0656* (2013.01); *H04B 1/02* (2013.01); *H04L 5/0055* (2013.01); *H04L 43/08* (2013.01); *H04L 43/0888* (2013.01); *H04W 28/02* (2013.01)

(58) Field of Classification Search
CPC ...... G06F 3/061; G06F 3/0656; G06F 3/0613; H04L 47/10; H04L 47/27; H04L 47/283; H04L 47/39; H04L 47/36; H04L 47/30; H04L 5/0055; H04L 43/08; H04L 43/0888; H04L 47/28; H04L 47/365; H04L 47/12; H04W 28/02
See application file for complete search history.

(56) References Cited

U.S. PATENT DOCUMENTS

| | | | |
|---|---|---|---|
| 7,269,172 B2 | 9/2007 | Kurth | |
| 7,428,243 B2 | 9/2008 | Marchetto | |
| 7,461,236 B1 * | 12/2008 | Wentzlaff | .......... G06F 15/17337 712/10 |
| 7,583,594 B2 | 9/2009 | Zakrzewski | |

(Continued)

OTHER PUBLICATIONS

Braden, R., Ed., "Requirements for Internet Hosts—Communication Layers", STD 3, RFC 1122, DOI 10.17487/RFC1122, Oct. 1989, <http://www.rfc-editor.org/info/rfc1122>.*

(Continued)

*Primary Examiner* — Michelle M Koeth
(74) *Attorney, Agent, or Firm* — Green, Howard & Mughal LLP

(57) ABSTRACT

Described is an apparatus which comprises: a transmitter; an input-output (I/O) interface coupled to the transmitter; and logic to split data for transmission into a plurality of packets, wherein each packet is stored in a buffer and then transmitted via the I/O interface to a receiver, wherein the logic can vary a number of packets sent prior to the transmitter receiving an Acknowledgement (ACK) signal, and wherein the logic can vary a packet length of the number of packets.

5 Claims, 9 Drawing Sheets

(56) References Cited

U.S. PATENT DOCUMENTS

| | | |
|---|---|---|
| 8,121,150 B1 | 2/2012 | Nelson |
| 2005/0141419 A1* | 6/2005 | Bergamasco ........... H04L 12/66 370/230 |
| 2006/0153150 A1 | 7/2006 | Yang et al. |
| 2009/0113082 A1* | 4/2009 | Adar ..................... G06F 13/387 710/15 |
| 2015/0351029 A1* | 12/2015 | Singh ................ H04W 52/0209 370/311 |

OTHER PUBLICATIONS

International Search Report and Written Opinion for PCT/US16/44538 mailed Oct. 25, 2016, 13 pages.

* cited by examiner

APPARATUS AND METHOD TO INCREASE THROUGHPUT OF A TRANSMITTER

BACKGROUND

In a credit-based flow control, a sender (e.g., a transmitter) can only transmit a packet to a receiver if the sender has credits to use. As such, when the sender runs out of credits, it must wait to get credits back from the receiver before transmitting another packet. When the receiver finishes processing the received packets from its buffer(s), it signals a return of credits to the sender, which increases the credit limit by the restored amount (e.g., up to a predetermined credit limit). The credits are stored in credit counters and decremented when used. When the credits reach the credit limit (i.e., when the available credits are zero), the sender stops transmitting packets. The advantage of this scheme (compared to other methods such as wait states or handshake-based transfer protocols) is that the latency of credit return generally does not affect performance, provided that the credit limit is not encountered. However, this assumption is not generally met.

One way to avoid the impact on performance (i.e., to avoid idle time of the sender and thus to avoid lower sender throughput) is to increase the number of credits (i.e., increase the credit limit) and/or the size of the receiving buffer. Increasing credit limit may require increasing the receiving buffer size to avoid a bottleneck at the receiver end. However, increasing the receiving buffer size is not possible dynamically as hardware is defined at the time of manufacturing and is a constant.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
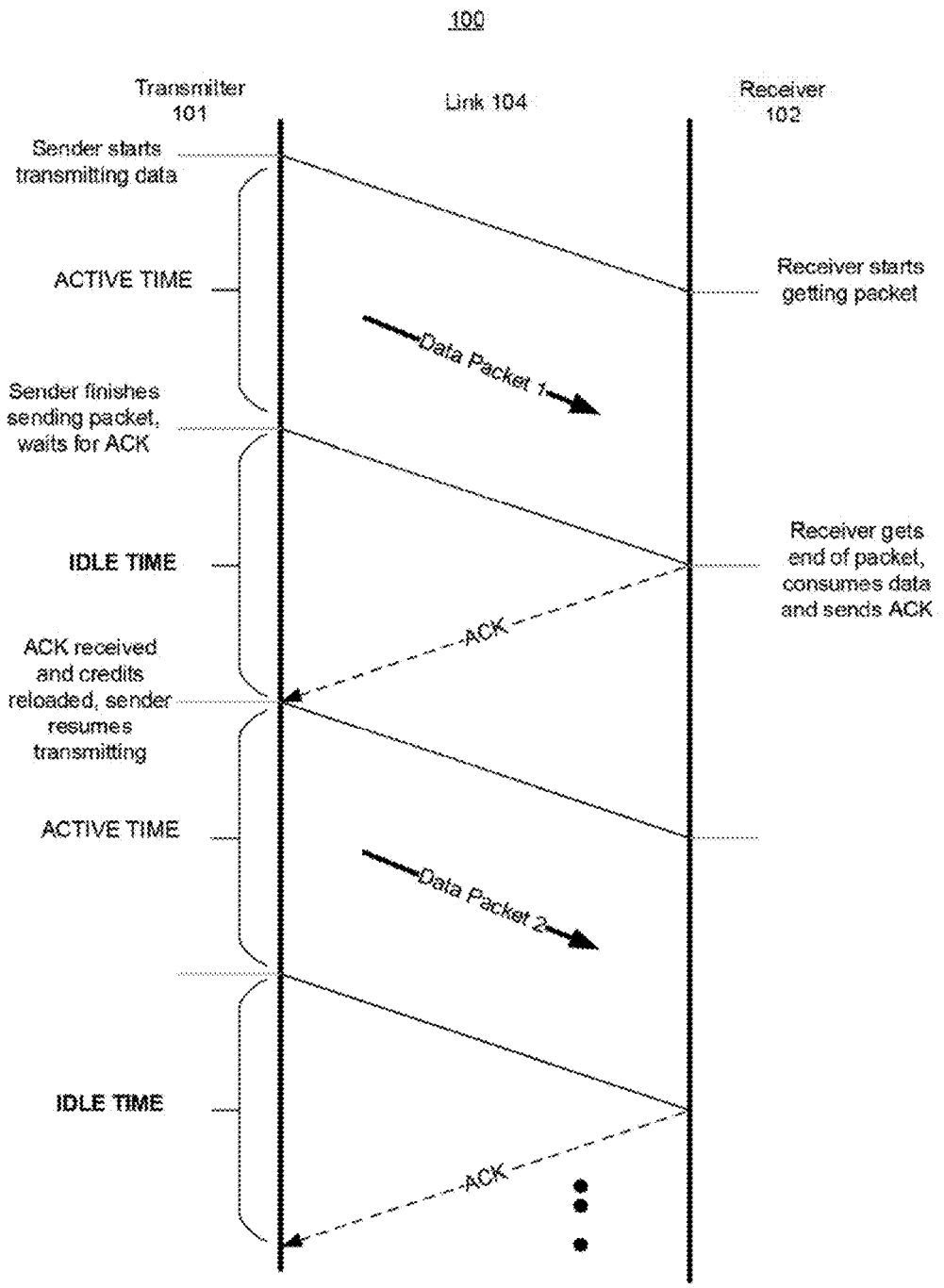
FIG. 1 illustrates a credit-based flow control with fixed-length packets resulting in large idle times and thus lower throughput for a transmitter.

FIG. 1 illustrates a credit-based flow control 100 with fixed-length packets resulting in large idle times and thus lower throughput. Here, Transmitter 101 (or sender) sends packets to Receiver 102 via Link 104 so long as Transmitter 101 has credits to transmit packets. In this example, Transmitter 101 starts sending Data Packet 1 to Receiver 102 over Link 104. Data Packet 1 has a header informing Receiver 102 about the length of the payload and other attributes about the packet. Data Packet 1 includes a payload which is the data itself. The time to send Data Packet 1 to Receiver 102 is considered ACTIVE TIME of Transmitter 101. In this example, Transmitter 101 has enough credits to send one data packet over link 104 to Receiver 102.

Once Transmitter 101 finishes sending Data Packet 1, it waits for an acknowledgement (ACK) signal from Receiver 102. Here, Transmitter 101 runs out of credits after completing transmission of Data Packet 1 and cannot send Data Packet 2 to Receiver 102. Transmitter 101 can only send Data Packet 2 once its credit is reloaded back to its credit limit. For that, Transmitter 101 has to wait for Receiver 102 to send the ACK signal. Receiver 102 upon receiving the end of the packet (e.g., the end of the payload), queues that data and then sends an ACK signal to Transmitter 101. As such, after the packet is sent, Transmitter 101 must wait a Round-Trip Time (RTT) to get credits back before sending another packet.

Here, RTT generally refers to the length of time it takes for a signal to be sent plus the length of time it takes for an acknowledgment (ACK) of that signal to be received. This time delay therefore consists of the propagation times between the two points of a signal.

During the time Transmitter 101 completes sending Data Packet 1 and waits for ACK signal to arrive from Receiver 102, Transmitter 101 is idle, which is indicated by the IDLE TIME. This IDLE TIME degrades the throughput of Transmitter 101 because Transmitter 101 could have been sending data but for the lack of credits, and thus has to wait for the ACK signal to reload its credits. The term "throughput" here generally refers to data packets transmitted per second or data packets transmitted per time slot. After Transmitter 101 receives the ACK signal, credits are reloaded. As such, Transmitter 101 is now capable of resuming transmitting of the next data packet-Data Packet 2.

Some embodiments describe a scheme (apparatus and/or method) to increase throughput of a transmitter by sending data in a series of shorter packets than sending data in one large packet as shown with reference to FIG. 1. In some embodiments, logic is provided to determine the optimal number 'N' of packets to split the data for transmission into such that IDLE TIME is reduced or eliminated altogether. In some embodiments, the logic is operable to adjust the number 'N' on the fly. As such, throughput can be adaptively or dynamically adjusted depending on one or more parameters (e.g., Round-Trip time, current number of credits (or available credits), length of data, etc.).

By modifying the packet size without changing the receiver buffer (or queue) size, smaller fixed-length buffers can be used at the receiver end (i.e., less hardware) while increasing throughput at the transmitter end, in accordance with some embodiments. The apparatus and method of various embodiments maximizes the time spent sending payload, and minimizes the time spent sending headers or being idle. Other technical effects will be evident from the various embodiments and figures.

In some embodiments, the scheme can be applied to any host that supports credit-based flow control without having to modify the receiver side. For example, the scheme of various embodiments can be applied to the Internet Protocol (IP), Transmission Control Protocol (TCP) (e.g., based on the version RFC 675 of December 1974, and the most current one), Media Agnostic Universal Serial Bus (MA USB) (e.g., as defined by Media Agnostic Universal Serial Bus Specification Release 1.0 of Feb. 25, 2014), Peripheral Component Interconnect Express (PCIe) (e.g., as defined by PCI Express 3.1 Specification Released Oct. 8, 2014), and other protocols that support credit-based flow control.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 2:
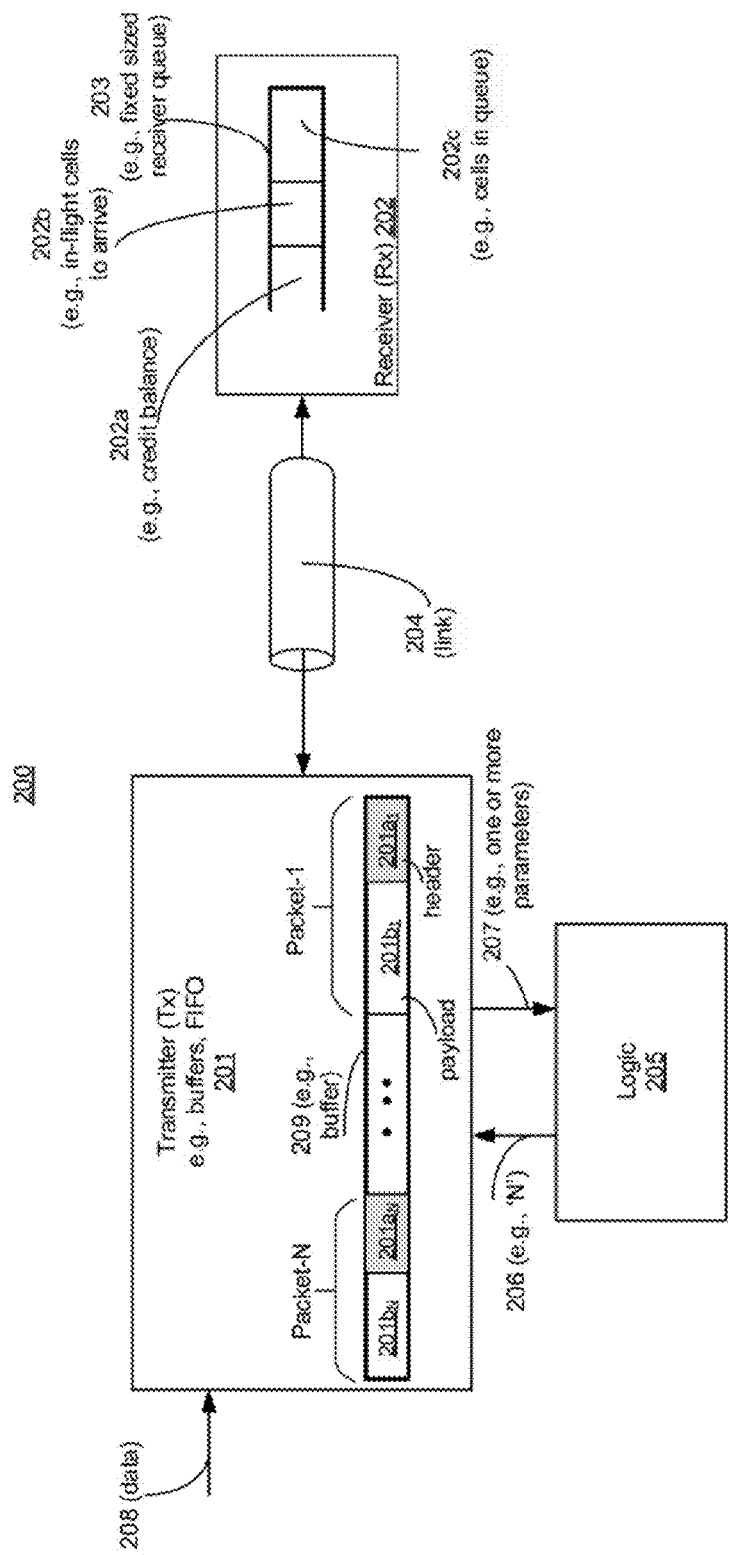
FIG. 2 illustrates a credit-based flow control system with fixed length receiver buffer(s) and logic to transmit variable-length packets to improve throughput of a transmitter, according to some embodiments of the disclosure.

FIG. 2 illustrates credit-based flow control system 200 with fixed length receiver buffer(s) and logic to transmit variable-length packets to improve throughput, according to some embodiments of the disclosure. In some embodiments, credit-based flow control system 200 comprises Transmitter (Tx) 201, Receiver (Rx) 202, link 204, and Logic 205 which is operable to determine the number 'N' of packets to split the data for transmission into such that IDLE TIME is reduced or eliminated altogether. So as not to obscure the various embodiments, a simplified version of Transmitter 201 and Receiver 202 are illustrated. However, a person skilled in the art would appreciate that other components such as transmitter input-output (I/O) driver, compensation circuits, logic gates, and analog circuits are not shown for simplicity purposes but may be needed for implementing the entire transmitter.

In some embodiments, Logic 205 analyzes one or more parameters 207 to determine the number 'N' (i.e., 206) of packets to split data 208 such that IDLE TIME is reduced or eliminated altogether. Examples of the one or more parameters 207 include: time spent idle by Transmitter 201; number of available credits left for Transmitter 201; total number of credits assigned to Transmitter 201; or Round-Trip time (RTT) between an I/O interface of Transmitter 201 and Receiver 202. Here, Tx 201 has buffer 209 which sends 'N' packets (i.e., Packet-1 to Packet-N) as a plurality of pairs of header and associated payload. For example, Packet-1 has header $201a_1$ and associated payload $201b_1$, and Packet-N has header $201a_N$ and associated payload $201b_N$. In some embodiments, buffer 209 is a chain of storage elements. For example, buffer 209 is a First-in-First-out (FIFO). Other examples of buffer 209 are a chain of registers or system memory.

In some embodiments, the length of the header for each packet is the same. For example, the length of the header for Packet-1 is the same as the length of the header for Packet-N. In some embodiments, header $201a$ is the same as other headers of the packet. For example, header $201a_1$ is the same as header $201a_N$. As such, header $201a_1$, $202a_2$, etc. are also referred to as header $201a$. In some embodiments, header $201a$ informs Receiver 202 about the attributes of the packet (e.g., length or size of payload). In some embodiments, Logic 205 can vary a number of packets sent prior to the transmitter receiving an Acknowledgement (ACK) signal. In some embodiments, Logic 205 can vary a packet length of the number of packets.

In some embodiments, packets are sent by Transmitter 201 to Receiver 202, where Receiver 202 stores or queues the received packet and then sends an ACK signal to Transmitter 201 indicating that the packet was successfully received. In some embodiments, Receiver 202 has a fixed sized queue 203. In some embodiments, fixed sized queue 203 has section $202a$ to maintain a credit balance of Transmitter 201. In some embodiments, fixed sized queue 203 has section $202b$ that maintains a count of the packets which are in-flight (i.e., expected to be received but not received yet). In some embodiments, fixed sized queue 203 has section $202c$ which are received packets or cells in a queue for further processing.

Transmitter 201 spends credits by transmitting packets to Receiver 202. The number of credits required to send a packet is based on the amount of data the packet contains. Initially, the sender (i.e., Transmitter 201) is given or allotted enough credits to fill the Receiver's queue 203. While the embodiments are described with reference to splitting data into 'N' packets with individual headers, the embodiments are applicable to other Protocol Data Units (PDUs).

For example, protocols in which information is delivered as a unit among peer entities of a network and that may contain control information such as address information or user data can also apply the scheme of various embodiments. In some embodiments, when Transmitter 201 receives the ACK signal, it reloads its credits and begins to transmit again. However, Transmitter 201 remains active by sending split-up data as packets to Receiver 202 up until Transmitter 201 runs out of credit. Here, the first ACK received by Transmitter 201 is far enough in time that Transmitter 201 continues to transmit the packets to Receiver 202 before having to wait for the ACK signal.

In some embodiments, Logic 205 determines an optimal value of 'N' which is the lowest value of 'N' that eliminates the time waiting for credits. This optimal value of 'N' is the value that achieves the maximum throughput, in accordance with some embodiments. For this value of 'N,' Transmitter 201 always has just enough credits to send the next packet out, in accordance with some embodiments. Increasing the value of 'N' beyond the optimal value may give Transmitter 201 more credits, but may result in more time sending headers and less time sending payload.

In some embodiments, Transmitter 201 is able to transmit an entire buffer of data before needing an ACK signal to return credits. This may result in bursty behavior, where Transmitter 201 sends as many packets as they can (i.e., a burst) and then waits for more credits before it engages in a next burst. The ACK signals arrive at Transmitter 201 one RTT after each data packet has finished sending. In some embodiments, ACK signals arrive at the same rate the data packets were sent. As a result, Transmitter 201 ends up sending buffer-sized bursts of packets, each occurring one RTT after the first packet of the previous burst, in accordance with some embodiments.

In some embodiments, Logic 205 logically splits buffer 209 into enough packets so that the time between bursts can potentially be eliminated. The following derivation illustrates how Transmitter 201 spends time during each burst.

Regardless of how many packets are used, Transmitter 201 spends the same amount of time transmitting payload in each burst, in accordance the some embodiments. This time (i.e., $t_{payload}$) can be expressed as:

$$t_{payload}(n)=B \tag{1}$$

where 'B' is the time to send one full buffer of payload and 'n' is the number of packets in each burst.

The amount of time spent in a burst transmitting headers $201a$ is directly proportional to the number of packets sent (i.e., 'n'), in accordance with some embodiments. This time spent in a burst transmitting headers (i.e., $t_{header}$) can be expressed as:

$$t_{header}(n)=Hn \tag{2}$$

where 'H' is the time to send one header.

The time it takes Transmitter 201 to send an individual packet (i.e., $t_{packet}$) can also be calculated as:

$$t_{packet}(n) = H + \frac{B}{n} \tag{3}$$

The time between the start of bursts is one RTT plus the time to transmit the first packet. This burst time (i.e., $t_{burst}$) can be expressed as follows:

$$t_{burst}(n)=RTT+t_{packet}(n) \tag{4}$$

The amount of time 't' Transmitter 201 spends idle varies, in accordance with some embodiments. In some embodiments, if Transmitter 201 never runs out of credits, Transmitter 201 never spends any time idle. In some embodiments, if Transmitter 201 does run out of credits, Transmitter 201 must wait for the ACK signal(s) to return before sending more packets. Any time not spent sending a packet is time spent idle. In the case when 'n' packets are sent in a burst, and the rest of the time is idle, idle time (i.e., $t_{idle}$) can be expressed as:

$$t_{idle}(n)=t_{burst}(n)-nt_{packet}(n) \tag{5}$$

Or, simplified as:

$$t_{idle}(n)=RTT+(1-n)t_{packet}(n) \tag{6}$$

To maximize throughput, idle time should be completely eliminated, in accordance with some embodiments. Maximum throughput can be achieved using the following assumptions. First, idle time is set to zero and the above equation is solved which results in:

$$RTT=(n-1)t_{packet}(n) \tag{7}$$

This means, to eliminate idle time, Logic 205 should pick 'n' such that "n−1" packets can be sent in one RTT. One way to approximate the optimal 'n' value is given as:

$$t_{idle}(n) = RTT - \left(\frac{n-1}{n}\right)(B+nH) \tag{8}$$

The above equation is a solved solution for idle time, in accordance with some embodiments. Assuming that the headers are much smaller than the payload (i.e., 'B' is much greater than "nH") (e.g., 201a is smaller in bit-size than payload $201b_1$), then $$t_{idle}(n) \approx RTT - \left(\frac{n-1}{n}\right)B \qquad (9)$$

Setting idle time to zero provides an approximation for the optimal 'n' value which can be expressed as:

$$n \approx \left(\frac{B}{B-RTT}\right) \qquad (10)$$

Using the above value for 'n' (same as 'N'), Transmitter 201 can maximize its throughput for a given credit limit and use a fixed sized receiver buffer, in accordance with some embodiments.

Figure 3:
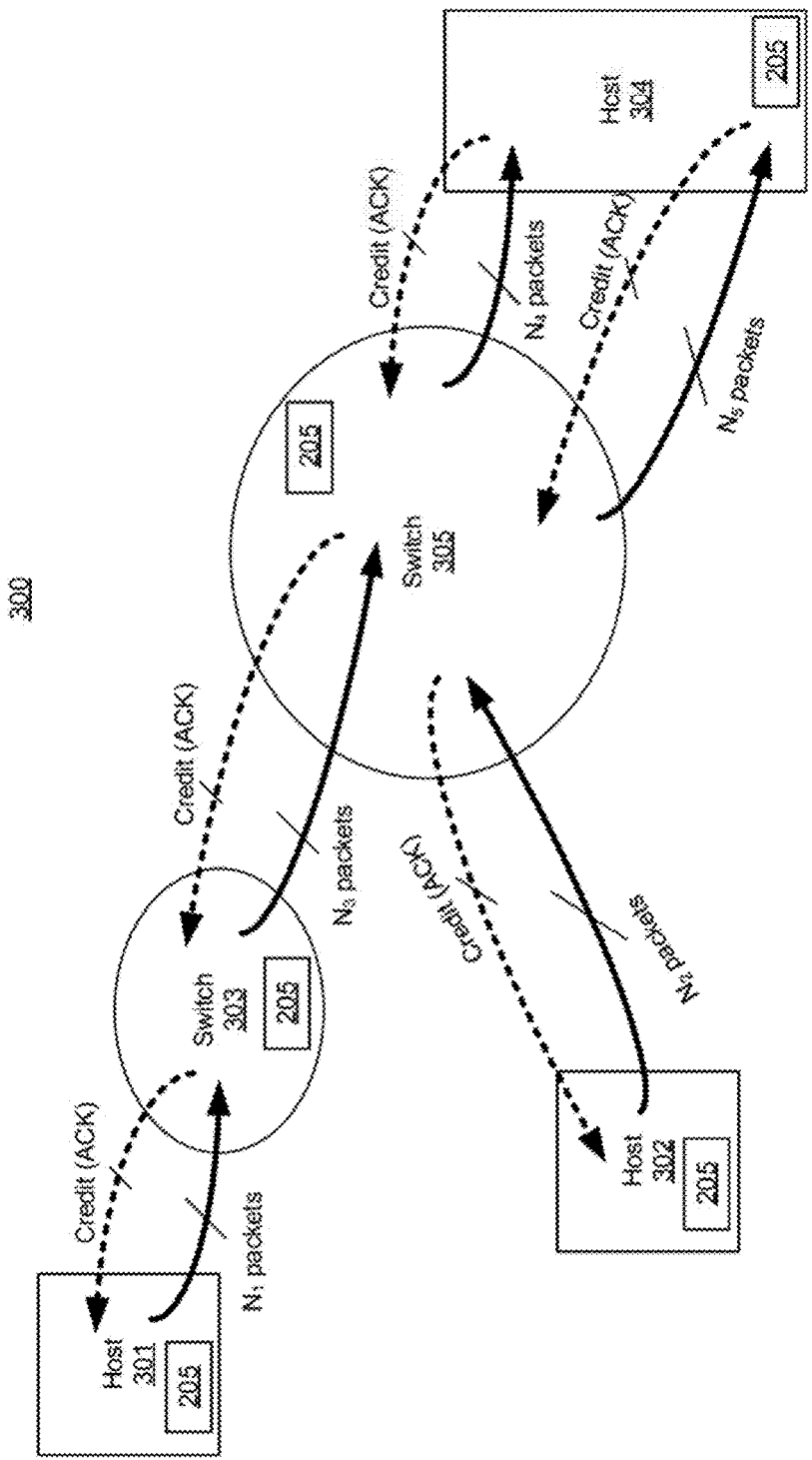
FIG. 3 illustrates a credit-based flow control system with multiple hosts and switches having logic to transmit variable-length packets to improve throughput of the transmitter, according to some embodiments of the disclosure.

FIG. 3 illustrates credit-based flow control system 300 with multiple hosts and switches having logic to transmit variable-length packets to improve throughput, according to some embodiments of the disclosure. It is pointed out that those elements of FIG. 3 having the same reference numbers (or names) as the elements of any other figure can operate or function in any manner similar to that described, but are not limited to such.

Credit-based flow control system 300 comprises a plurality of hosts (e.g., Host 301, 302, and 304) and a plurality of switches (e.g., Switch 303 and 305), where each host and switch has Logic 205 which is operable to cause its transmitter to transmit variable-length packets to improve throughput, according to some embodiments of the disclosure. Credit-based flow control system 300 illustrates that Host 301 sends $N_1$, packets as discussed with reference to 'N' in FIG. 2, to Switch 303 such that the throughput of Host 301 is improved (i.e., increased over the throughput of system 100). Referring back to FIG. 3, the dotted line shows the ACK signal received by the sender that can be used for reloading the credits at the sender end.

In some embodiments, Host 302 sends packets $N_2$, as discussed with reference to 'N' in FIG. 2, to Switch 305 such that the throughput of Host 302 is improved (i.e., increased over the throughput of system 100). The dotted line shows the ACK signal received by Host 302 that can be used for reloading the credits at Host 302.

In some embodiments, Switch 303 also behaves as a transmitter and sends packets $N_3$, as discussed with reference to 'N' in FIG. 2, to Switch 305 such that the throughput of Switch 303 is improved (i.e., increased over the throughput of system 100). The dotted line shows the ACK signal received by Switch 303 that can be used for reloading the credits at Switch 303.

In some embodiments, Switch 305 has multiple links for transmitting and receiving packets and ACK signals. In some embodiments, Switch 305 behaves as a transmitter and sends $N_4$ and $N_5$ packets, as discussed with reference to 'N' in FIG. 2, to Host 304 such that the throughput of Switch 305 is improved (i.e., increased over the throughput of system 100). In this example, Host 304 behaves as a receiver of multiple links. The dotted line shows the ACK signals received by Switch 305 can be used for reloading the credits at Switch 305. In this example, Switch 305 maintains credits for two different types of packet transmissions—one with packets $N_4$ and another with packets $N_5$.

Figure 4:
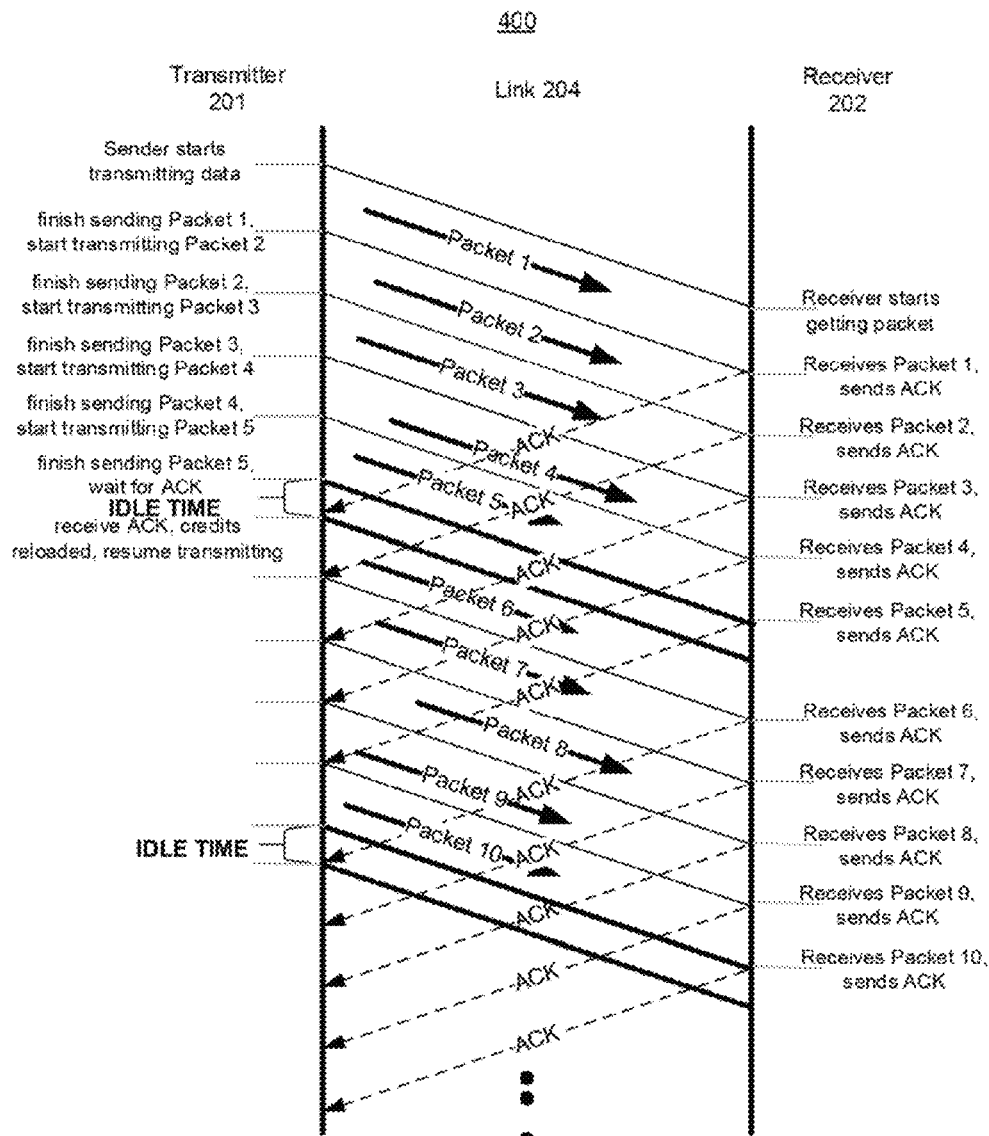
FIG. 4 illustrates a credit-based flow control with variable-length packets resulting in small idle times and thus higher throughput of the transmitter, according to some embodiments of the disclosure.

FIG. 4 illustrates credit-based flow control 400 with variable-length packets resulting in smaller idle times and thus higher throughput (compared to system 100), according to some embodiments of the disclosure. It is pointed out that those elements of FIG. 4 having the same reference numbers (or names) as the elements of any other figure can operate or function in any manner similar to that described, but are not limited to such. FIG. 4 is described with reference to FIG. 1 and FIG. 2.

In FIG. 1, Transmitter 101 uses all of the available credits to send one large packet with payload that entirely fills the receiver buffer and uses all the credits. As such, to send additional payload (or packet), Transmitter 101 has to wait for the ACK signal from Receiver 102. This causes long idle times, and thus lower throughput.

In a case where the sender only uses half of the total credits to send a packet with payload that fills half the receive buffer, after sending the first packet, the sender has half of the total credits remaining. In one such embodiment, the sender can use these remaining credits to send a second packet immediately without having to wait for the ACK signal. As such, the second half of the credits are used. After sending out the second packet, the sender may then wait for an ACK signal containing credits before sending another packet to Receiver 202. By dividing the payload into two separate packets (i.e., N=2), the amount of time sender 201 spends waiting for credits is reduced compared to the IDLE TIME of FIG. 1, in accordance with some embodiments.

In some embodiments, 'N' can be scaled adaptively. For example, depending on the available credits and the length of incoming data 208, Logic 205 may update the value of 'N' dynamically to maximize the throughput. As such, 'N' is not fixed but is a function of one or more parameters (e.g., RTT, available credits, size of data 208, etc.). In one example, if Logic 205 sets N=3, then data is divided into at least three packets. If three packets are sent, each using ⅓ of the credits, even less time is spent waiting for credits compared to system 100 of FIG. 1. To generalize, in some embodiments, sender 201 can send 'N' number of packets each using 1/Nth of the total credits. By choosing a value of 'N' that is large enough, the time waiting for credits can be eliminated and data can be sent constantly, in accordance with some embodiments.

Credit-based flow control 400 shows Transmitter 201 transmitting five packets (i.e., N=5) over Link 204 to Receiver 202 before receiving an ACK signal from Receiver 202. As such, the IDLE TIME is significantly reduced compared to the IDLE TIME of system 100 of FIG. 1. In some embodiments, the IDLE TIME can be further reduced by increasing the value of 'N' to be greater than '5.'

Figure 5:
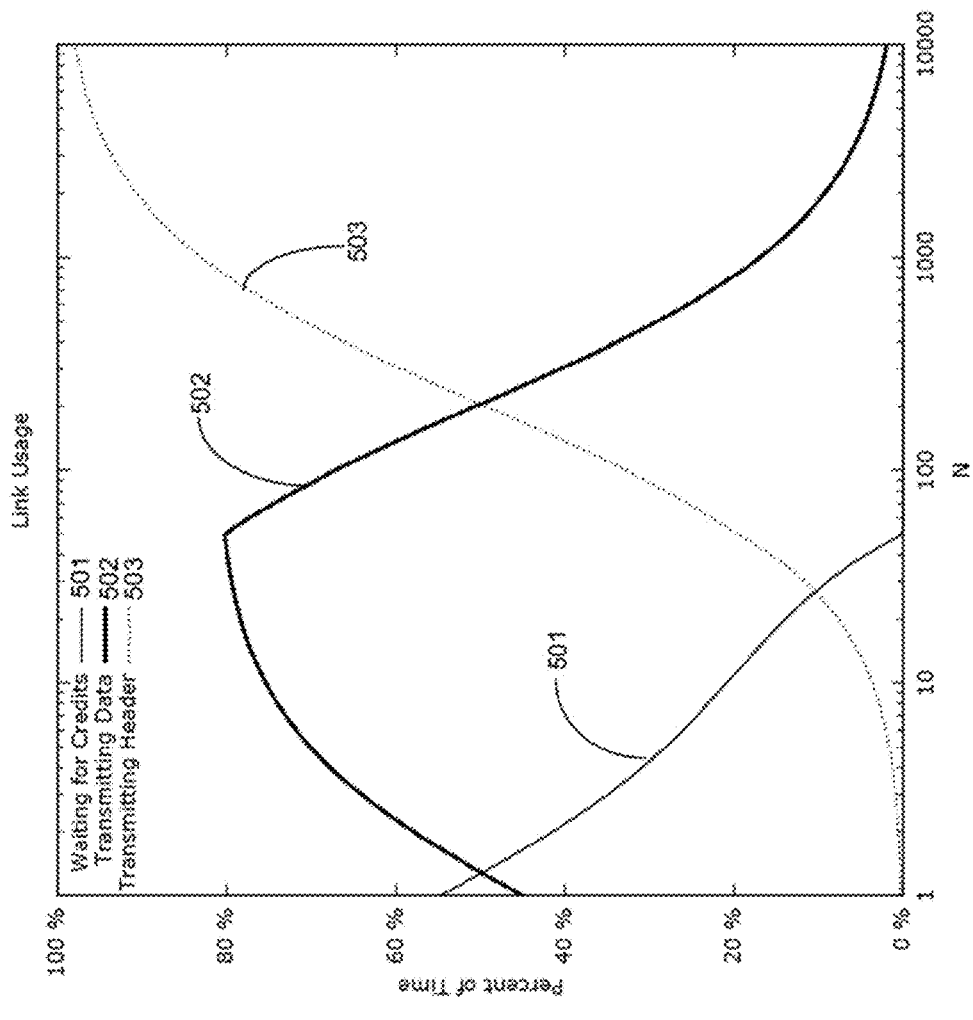
FIG. 5 illustrates a plot showing optimization of the number of data splits 'N' and associated tradeoffs to achieve small idle times and thus higher throughput of the transmitter, according to some embodiments of the disclosure.

FIG. 5 illustrates plot 500 showing the optimization of the number of data splits 'N' and associated tradeoffs to achieve smaller idle times and thus higher throughput, according to some embodiments of the disclosure. It is pointed out that those elements of FIG. 5 having the same reference numbers (or names) as the elements of any other figure can operate or function in any manner similar to that described, but are not limited to such. Here, x-axis is 'N' and y-axis is percentage of Time.

Plot 500 illustrates three waveforms—501, 502, and 503. Waveform 501 represents the percentage of time spent by a sender (e.g., Transmitter 201) waiting for credits as a function of 'N.' As the value of 'N' increases, the time spent waiting for credits decreases. As such, with a sufficiently large value of 'N,' the time spent waiting can be eliminated altogether.

Waveform 502 represents the percentage of time spent by the sender transmitting data as a function of 'N.' The percentage of time spent by the sender transmitting data increases as 'N' increases until IDLE TIME is eliminated. Once IDLE TIME is eliminated, increasing 'N' may have a negative effect on the percentage of time spent by the sender transmitting data. The maxima of waveform 502 (which is the top of the waveform 502) provides the value of 'N' for which Transmitter 201 has the highest throughput. In some embodiments, Logic 205 chooses 'N' to be the maxima of waveform 502.

Waveform 503 represents the percentage of time spent by the sender transmitting header as a function of 'N.' In some embodiments, the number of headers sent by Transmitter 201 is equal to the number of packets sent. As such, the percentage of time spent by Transmitter 201 transmitting headers increases as 'N' increases. In some embodiments, a mathematical model of the three waveforms—501, 502, and 503—can be used by Logic 205 to determine the optimal 'N' that results in the highest throughput.

Figure 6:
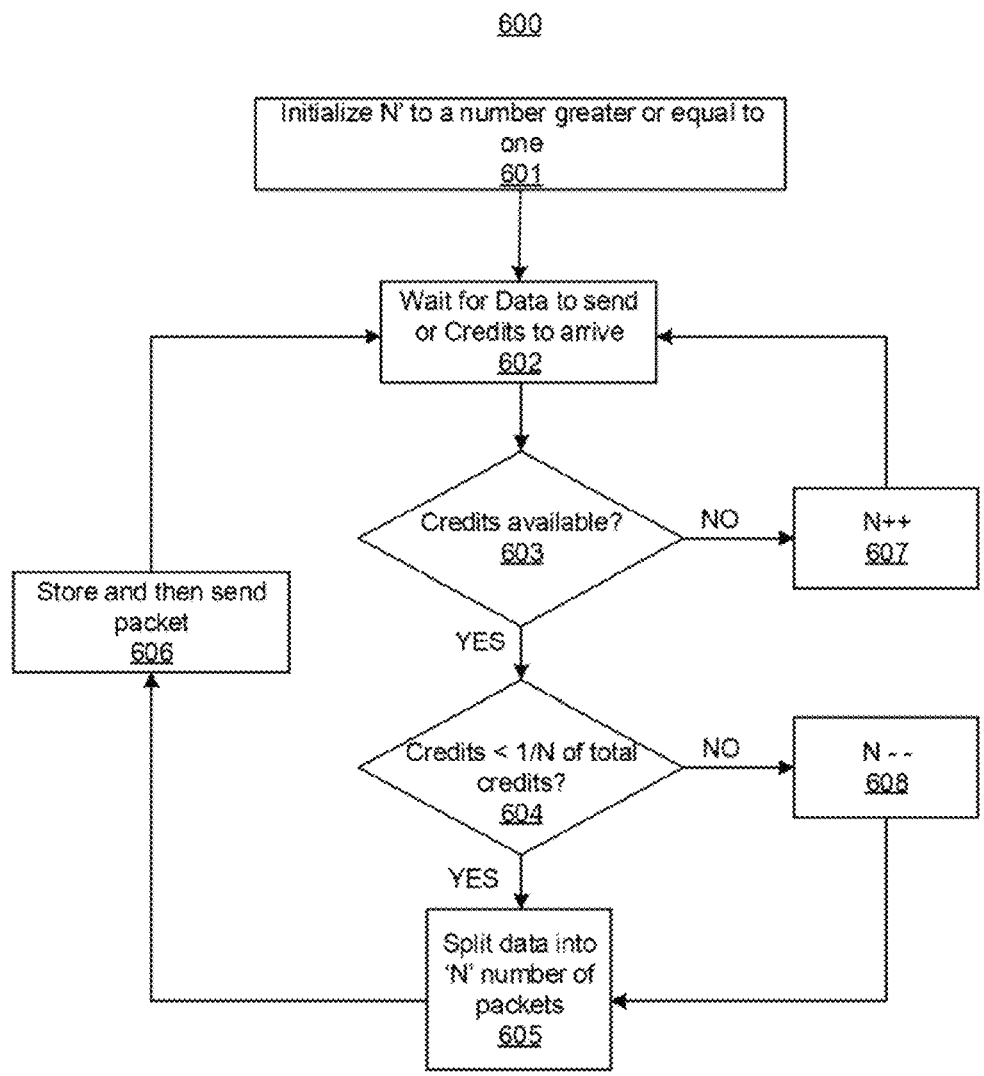
FIG. 6 illustrates a flowchart of a method to determine optimal value of the number of data splits 'N' by monitoring available number of credits, according to some embodiments of the disclosure.

FIG. 6 illustrates flowchart 600 of a method to determine optimal value of the number of data splits 'N' by monitoring available number of credits, according to some embodiments of the disclosure. It is pointed out that those elements of FIG. 6 having the same reference numbers (or names) as the elements of any other figure can operate or function in any manner similar to that described, but are not limited to such.

Although the blocks in the flowchart with reference to FIG. 6 are shown in a particular order, the order of the actions can be modified. Thus, the illustrated embodiments can be performed in a different order, and some actions/blocks may be performed in parallel. Some of the blocks and/or operations listed in FIG. 6 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 601, Logic 205 initializes the value of 'N' to be equal or greater than one. After the initialization process, at block 602, Logic 205 waits for Transmitter 201 to send data to Receiver 202. In some embodiments, Logic 205 waits for credits to arrive if Transmitter 201 is out of credits. At block 603, Logic 205 makes a determination about whether credits are available. If no credits are available, the process proceeds to block 607. If credits are available, then the process proceeds to block 604.

At block 607, Logic 205 increments 'N' by one (i.e., N=N+1). The updated value of 'N' is then used for splitting data 208, in accordance with some embodiments. The process then proceeds to block 602.

At block 604, Logic 205 makes a determination whether credits are less than 1/Nth of the total credits (i.e., the credit limit). If the credits are less than 1/Nth of the total credits, the process proceeds to block 605. Otherwise, the process proceeds to block 608.

At block 608, Logic 205 decrements 'N' by one (i.e., N=N−1). The updated value of 'N' is then used for splitting data 208, as illustrated by block 605. If the credits are less than 1/Nth of the total credits, Logic 205 splits data 208 into 'N' number of packets as illustrated by block 605. The process then proceeds to block 606.

At block 606, the packets are stored in buffer 209. For example, the packets are queued up for transmission and then transmitted as illustrated by block 602.

Figure 7:
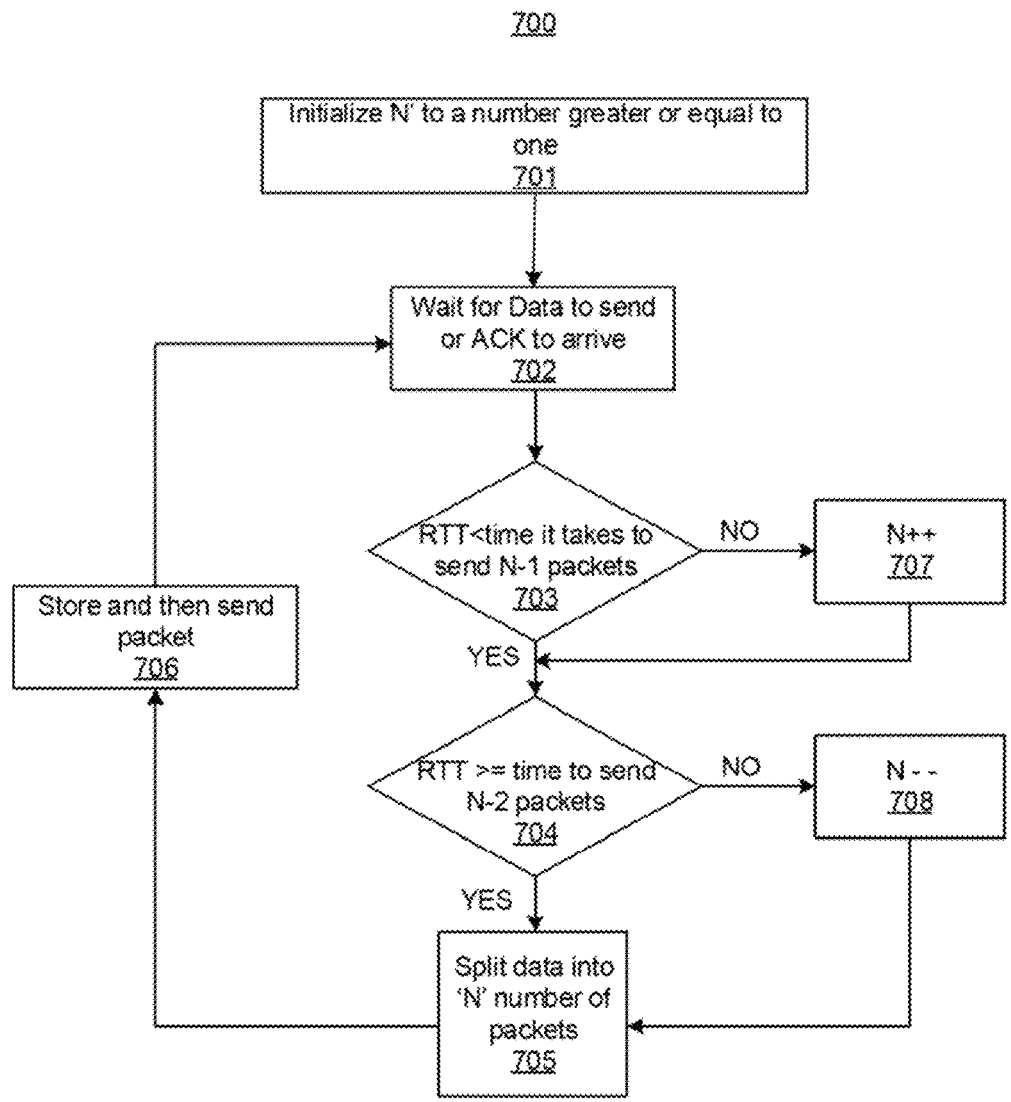
FIG. 7 illustrates a flowchart of a method to determine an optimal value of the number of data splits 'N' using Round-Trip Time (RTT), according to some embodiments of the disclosure.

FIG. 7 illustrates flowchart 700 of a method to determine optimal value of the number of data splits 'N' using RTT, according to some embodiments of the disclosure. It is pointed out that those elements of FIG. 7 having the same reference numbers (or names) as the elements of any other figure can operate or function in any manner similar to that described, but are not limited to such.

Although the blocks in the flowchart with reference to FIG. 7 are shown in a particular order, the order of the actions can be modified. Thus, the illustrated embodiments can be performed in a different order, and some actions/blocks may be performed in parallel. Some of the blocks and/or operations listed in FIG. 7 are optional in accordance with certain embodiments. The numbering of the blocks presented is for the sake of clarity and is not intended to prescribe an order of operations in which the various blocks must occur. Additionally, operations from the various flows may be utilized in a variety of combinations.

At block 701, Logic 205 initializes the value of 'N' to be equal or greater than one. After the initialization process, at block 702, Logic 205 waits for Transmitter 201 to send data to Receiver 202. In some embodiments, Logic 205 waits for credits to arrive if Transmitter 201 is out of credits.

At block 703, Logic 205 makes a determination about whether the time it takes to send "N−1" packets from Transmitter 201 to Receiver 202 is greater than RTT. If the time it takes to send "N−1" packets from Transmitter 201 to Receiver 202 is greater than RTT, the process proceeds to block 704. Otherwise, the process proceeds to block 707.

At block 707, 'N' is incremented by one (i.e., N=N+1) and the process proceeds to block 703. At block 703, Logic 205 makes a determination about whether the time it takes to send "N−2" packets from Transmitter 201 to Receiver 202 is less than or equal to RTT. If the time it takes to send "N−2" packets from Transmitter 201 to Receiver 202 is less than or equal to RTT, then the process proceeds to block 705. Otherwise, the process proceeds to block 708.

At block 708, Logic 205 decrements 'N' by one (i.e., N=N−1). The updated value of 'N' is then used for splitting data 208, as illustrated by block 705. The process then proceeds to block 706. At block 706, the packets are stored in buffer 209. For example, the packets are queued up for transmission and then transmitted as illustrated by block 702.

In some embodiments, the flowcharts of FIGS. 6-7 try to achieve the lowest possible value of 'N that allows Transmitter 201 to constantly send data (i.e., IDLE TIME is substantially zero). However, if network conditions change, Logic 205 is operable to adaptively adjust the value of 'N,' in accordance with some embodiments. For example, if RTT changes that causes 'N' to become too high or too low, Logic 205 adjusts 'N' using flowchart 700 to a new optimal value (i.e., a value that results in substantially zero IDLE TIME).

Figure 8:
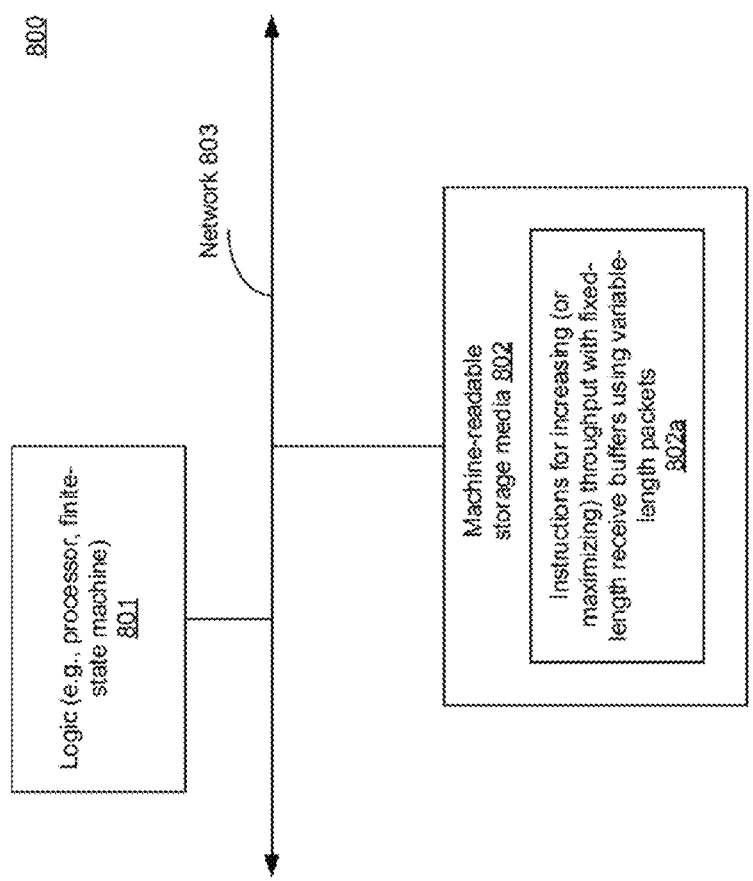
FIG. 8 illustrates a host with machine-readable storage media having machine executable instructions to perform the method(s) of FIG. 6 and/or FIG. 7, according to some embodiments of the disclosure.

FIG. 8 illustrates host 800 with machine-readable storage media having machine executable instructions to perform the method(s) of FIG. 6 and/or FIG. 7, according to some embodiments of the disclosure. It is pointed out that those elements of FIG. 8 having the same reference numbers (or names) as the elements of any other figure can operate or function in any manner similar to that described, but are not limited to such.

In some embodiments, host 800 comprises Logic 801 (e.g., Logic 205) and machine-readable storage media 802 coupled to Network 803. In some embodiments, Logic 801 is a microcontroller (e.g., a processor or a finite state machine) which is operable to execute instructions for increasing (or maximizing) throughput of Transmitter 201 using variable-length packets while Receiver 202 has fixed-length receive buffers.

Program software code/instructions 802a associated with flowcharts 600/700 and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts 600/700 are executed by a terminal device (such as shown in FIGS. 6-7).

Referring back to FIG. 8, in some embodiments, the program software code/instructions 802a associated with flowcharts 600/700 are stored in a computer executable storage medium 802 and executed by Logic 801. Here, computer executable storage medium 802 is a tangible machine readable medium that can be used to store program software code/instructions 802a and data that, when executed by a computing device, causes one or more processors to perform a method(s) as may be recited in one or more accompanying claims directed to the disclosed subject matter.

The tangible machine readable medium 802 may include storage of the executable software program code/instructions 802a and data in various tangible locations, including for example ROM, volatile RAM, non-volatile memory and/or cache and/or other tangible memory as referenced in the present application. Portions of this program software code/instructions and/or data 802a may be stored in any one of these storage and memory devices. Further, the program software code/instructions 802a can be obtained from other storage, including, e.g., through centralized servers or peer to peer networks and the like, including the Internet. Different portions of the software program code/instructions and data can be obtained at different times and in different communication sessions or in the same communication session.

The software program code/instructions 802a (associated with flowchart(s) 600/700) and data can be obtained in their entirety prior to the execution of a respective software program or application by the computing device. Alternatively, portions of the software program code/instructions 802a and data can be obtained dynamically, e.g., just in time, when needed for execution. Alternatively, some combination of these ways of obtaining the software program code/instructions 802a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 802 include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions 802a may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry®Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Figure 9:
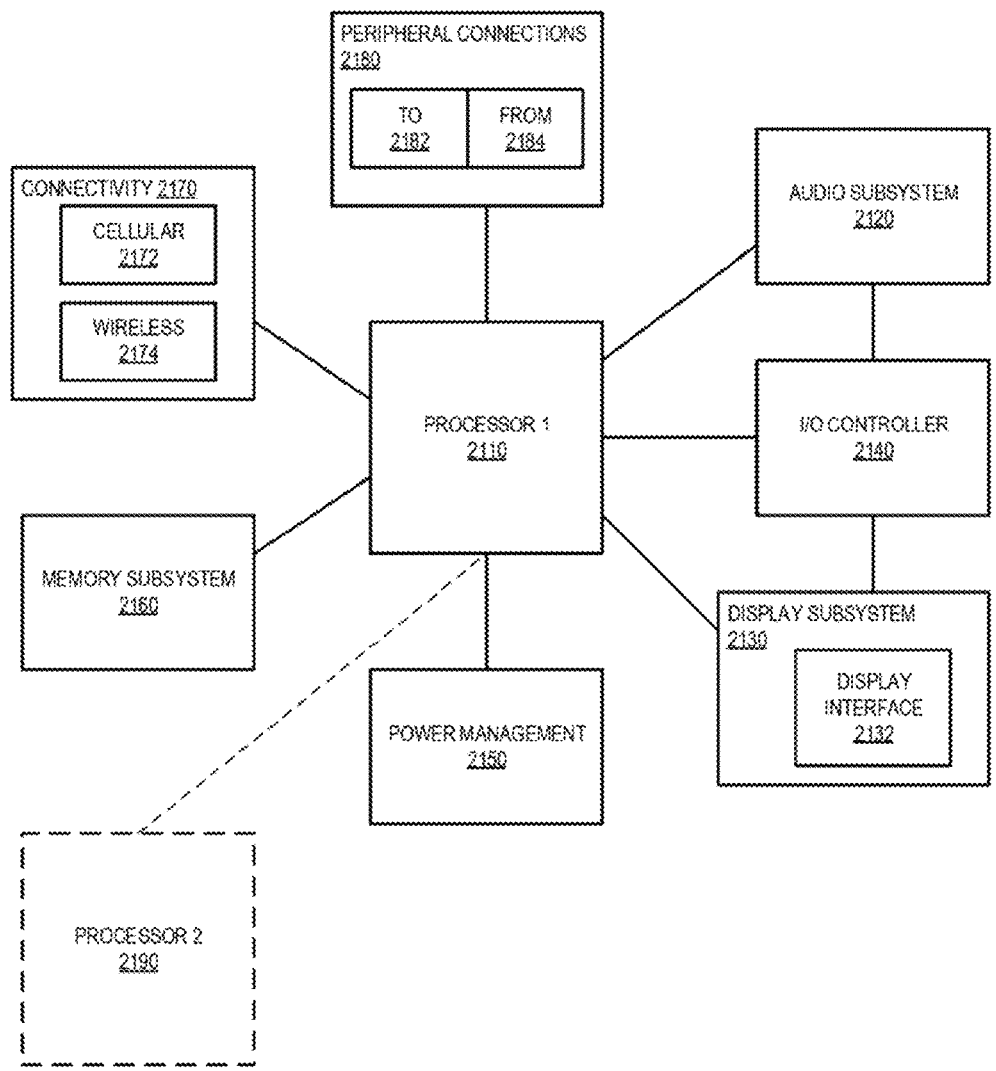
FIG. 9 illustrates a smart device or a computer system or a SoC (System-on-Chip) having apparatus to transmit variable-length packets to improve throughput of a transmitter, according to some embodiments.

FIG. 9 illustrates a smart device or a computer system or a SoC (System-on-Chip) having apparatus to transmit variable-length packets to improve throughput, according to some embodiments. It is pointed out that those elements of FIG. 9 having the same reference numbers (or names) as the elements of any other figure can operate or function in any manner similar to that described, but are not limited to such.

FIG. 9 illustrates a block diagram of an embodiment of a mobile device in which flat surface interface connectors could be used. In some embodiments, computing device 2100 represents a mobile computing device, such as a computing tablet, a mobile phone or smart-phone, a wireless-enabled e-reader, or other wireless mobile device. It will be understood that certain components are shown generally, and not all components of such a device are shown in computing device 2100.

In some embodiments, computing device 2100 includes a first processor 2110 having apparatus to transmit variable-length packets to improve throughput, according to some embodiments discussed. Other blocks of the computing device 2100 may also include embodiment(s) to transmit variable-length packets to improve throughput. The various embodiments of the present disclosure may also comprise a network interface within 2170 such as a wireless interface so that a system embodiment may be incorporated into a wireless device, for example, cell phone or personal digital assistant.

In one embodiment, processor 2110 (and/or processor 2190) can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a transmitter, an input-output (VO) interface coupled to the transmitter, and logic to split data for transmission into a plurality of packets, wherein each packet is stored in a buffer and then transmitted via the I/O interface to a receiver, wherein the logic can vary a number of packets sent prior to the transmitter receiving an Acknowledgement (ACK) signal, and wherein the logic can vary a packet length of the number of packets.

In some embodiments, the logic is operable to analyze one or more parameters associated with the transmitter to determine the number of packets to generate from splitting of the data. In some embodiments, the one or more parameters include at least one of: time spent idle by the transmitter; number of available credits left for the transmitter; total number of credits assigned to the transmitter; or Round-Trip Time (RTT) between the transmitter and the receiver.

In some embodiments, the logic is operable to adaptively split data for transmission into the plurality of packets according to the one or more parameters. In some embodiments, the I/O interface is to receive the ACK signal from the receiver after the receiver receives a first packet of the plurality of packets. In some embodiments, the transmitter supports a protocol for variable length packets. In some embodiments, the protocol applies a credit based flow control for transmitting the data. In some embodiments, the buffer is at least one of: a FIFO; a chain of registers; or a system memory. In some embodiments, the receiver has a fixed sized buffer.

In another example, a machine readable storage media having machine readable storage instructions that when executed cause one or more processors to perform an operation comprising: initialize 'N' to a number greater than or equal to one, wherein 'N' represents a number of splits of data into a plurality of packets for transmission by a transmitter, wherein the transmitter includes a buffer; determine whether credits are available for the transmitter to transmit packets to a receiver; and increase 'N' by one if credits are available below a threshold.

In some embodiments, a machine readable storage media has further machine readable storage instructions that when executed cause the one or more processors to perform a further operation comprising: split data into 'N' number of packets for transmission after 'N' is increased by one; and store the 'N' number of packets in the buffer.

In some embodiments, the machine readable storage media has further machine readable storage instructions that when executed cause the one or more processors to perform a further operation comprising: transmit a first packet, of the stored 'N' number of packets, to the receiver; and receive an acknowledgement from the receiver. In some embodiments, the machine readable storage media has further machine readable storage instructions that when executed cause the one or more processors to perform a further operation comprising: determine whether the transmitter has more than 1/N of total credits; and decrement 'N' by one when it is determined that the transmitter has more than 1/N of the total credits.

In some embodiments, the machine readable storage media has further machine readable storage instructions that when executed cause the one or more processors to perform a further operation comprising: split data into 'N' number of packets for transmission after 'N' is decremented by one; and store the 'N' number of packets in the buffer. In some embodiments, the machine readable storage media has further machine readable storage instructions that when executed cause the one or more processors to perform a further operation comprising: transmit a first packet, of the stored 'N' number of packets, to the receiver; and receive an acknowledgement from the receiver.

In another example, a system is provided which comprises: a memory; a processor coupled to the memory, the processor including an apparatus according to the apparatus described above; and a wireless interface for allowing the processor to communicate with another device.

In another example, a method is provided which comprises: initializing 'N' to a number greater than or equal to one, wherein 'N' represents a number of splits of data into a plurality of packets for transmission by a transmitter, wherein the transmitter includes a buffer; determining whether credits are available for the transmitter to transmit packets to a receiver; and increasing 'N' by one if credits are available below a threshold. In some embodiments, the method comprises: splitting data into 'N' number of packets for transmission after 'N' is increased by one; and storing the 'N' number of packets in the buffer.

In some embodiments, the method comprises: transmitting a first packet, of the stored 'N' number of packets, to the receiver; and receiving an acknowledgement from the receiver. In some embodiments, the method comprises:

determining whether the transmitter has more than 1/N of total credits; and decrementing 'N' by one when it is determined that the transmitter has more than 1/N of the total credits. In some embodiments, the method comprises: splitting data into 'N' number of packets for transmission after 'N' is decremented by one; and storing the 'N' number of packets in the buffer. In some embodiments, the method comprises: transmitting a first packet, of the stored 'N' number of packets, to the receiver; and receiving an acknowledgement from the receiver.

In another example, an apparatus is provided which comprises: means for initializing 'N' to a number greater than or equal to one, wherein 'N' represents a number of splits of data into a plurality of packets for transmission by a transmitter, wherein the transmitter includes a buffer, means for determining whether credits are available for the transmitter to transmit packets to a receiver, and means for increasing 'N' by one if credits are available below a threshold.

In some embodiments, the apparatus comprises: means for splitting data into 'N' number of packets for transmission after 'N' is increased by one; and means for storing the 'N' number of packets in the buffer. In some embodiments, the apparatus comprises: means for transmitting a first packet, of the stored 'N' number of packets, to the receiver; and means for receiving an acknowledgement from the receiver.

In some embodiments, the apparatus comprises: means for determining whether the transmitter has more than 1/N of total credits; and means for decrementing 'N' by one when it is determined that the transmitter has more than 1/N of the total credits. In some embodiments, the apparatus comprises: means for splitting data into 'N' number of packets for transmission after 'N' is decremented by one; and means for storing the 'N' number of packets in the buffer. In some embodiments, the apparatus comprises: means for transmitting a first packet, of the stored 'N' number of packets, to the receiver; and means for receiving an acknowledgement from the receiver.

In another example, a system is provided which comprises: a memory; a processor coupled to the memory, the processor having an apparatus according to the apparatus described above; and a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

I claim:

1. An apparatus comprising:
a transmitter transmitting variable length packets of data using a credit based flow control protocol;
an input-output (I/O) interface coupled to the transmitter; and
logic to split data for transmission into a plurality of packets, wherein each packet is stored in a transmitter buffer and then transmitted via the I/O interface to a receiver through a wired apparatus, wherein the logic varies a number of packets sent prior to the apparatus receiving an Acknowledgement (ACK) signal and return credits, wherein the logic varies a packet length of the number of packets,
wherein the logic is operable to analyze parameters associated with the transmitter to determine the number of packets to generate from the splitting of the data that eliminates a time of waiting for the return credits;
wherein the logic is operable to adaptively split data for transmission into the plurality of packets responsive to changes in the values of the parameters,
wherein the parameters include:
a time spent idle by the transmitter when the transmitter is not sending a packet; and
a Round-Trip Time (RTT) between the transmitter and the receiver; and
wherein the receiver receives the plurality of packets using a fixed size buffer.

2. The apparatus of claim 1, wherein the I/O interface is to receive the ACK signal from the receiver after the receiver receives a first packet of the plurality of packets.

3. The apparatus of claim 1, wherein the transmitter supports a protocol for variable length packets.

4. The apparatus of claim 1, wherein the transmitter buffer is at least one of:
a FIFO;
a chain of registers; or
a system memory.

5. A system comprising:
a memory;
a processor coupled to the memory, the processor including:
a transmitter transmitting variable length packets of data using a credit based flow control protocol;
an input-output (I/O) interface coupled to the transmitter; and
logic to split data for transmission into a plurality of packets, wherein each packet is stored in a buffer and then transmitted via the I/O interface to a receiver through a wired apparatus, wherein the logic varies a number of packets sent prior to the processor receiving an Acknowledgement (ACK) signal and return credits, wherein the logic varies a packet length of the number of packets,
wherein the logic is operable to analyze parameters associated with the transmitter to determine the number of packets to generate from the splitting of the data that eliminates a time of waiting for the return credits,
wherein the logic is operable to adaptively split data for transmission into the plurality of packets responsive to changes in the values of the parameters,
wherein the parameters include:
a time spent idle by the transmitter when the transmitter is not sending a packet; and
a Round-Trip Time (RTT) between the transmitter and the receiver;
wherein the receiver receives the plurality of packets using a fixed size buffer; and
a wireless interface for allowing the processor to communicate with another device.

* * * * *